W. H. B. JOHNSON, T. E. LIND & T. W. CLARKE.
AUTOMOBILE.
APPLICATION FILED DEC. 7, 1916.

1,301,447.

Patented Apr. 22, 1919.
3 SHEETS—SHEET 2.

INVENTORS
William H. B. Johnson
Theodore E. Lind
Thomas W. Clarke

By
C. D. Haskins
ATTORNEY

W. H. B. JOHNSON, T. E. LIND & T. W. CLARKE.
AUTOMOBILE.
APPLICATION FILED DEC. 7, 1916.

1,301,447.

Patented Apr. 22, 1919.
3 SHEETS—SHEET 3.

INVENTORS
William H. B. Johnson
Theodore E. Lind
Thomas W. Clarke
BY
C. D. Hackins
ATTORNEY

UNITED STATES PATENT OFFICE.

WILLIAM H. B. JOHNSON, THEODORE E. LIND, AND THOMAS W. CLARKE, OF SEATTLE, WASHINGTON.

AUTOMOBILE.

1,301,447.        Specification of Letters Patent.        Patented Apr. 22, 1919.

Application filed December 7, 1916. Serial No. 135,708.

*To all whom it may concern:*

Be it known that we, WILLIAM H. B. JOHNSON, THEODORE E. LIND, and THOMAS W. CLARKE, citizens of the United States, residing at Seattle, in the county of King and State of Washington, have invented a certain new and useful Improvement in Automobiles, of which the following is a specification.

Our invention relates to improvements in automobiles, and the object of our invention is to provide an automobile which shall be adapted to serve as a tractor for drawing another vehicle in its trail and which shall be specially adapted to receive and support the forward end portion of lumber or timbers whose remaining portions are loaded upon the axle of a trailer comprising a two wheeled lumber truck, such as is commonly used in lumber yards for trundling lumber from one point to another, thus to facilitate the transportation of said lumber or timbers from a lumber yard directly to a desired point of delivery without transferring said lumber or timbers from said lumber yard truck to a special delivery wagon.

We accomplish these objects by devices illustrated in the accompanying drawings, wherein—

Figure 1:
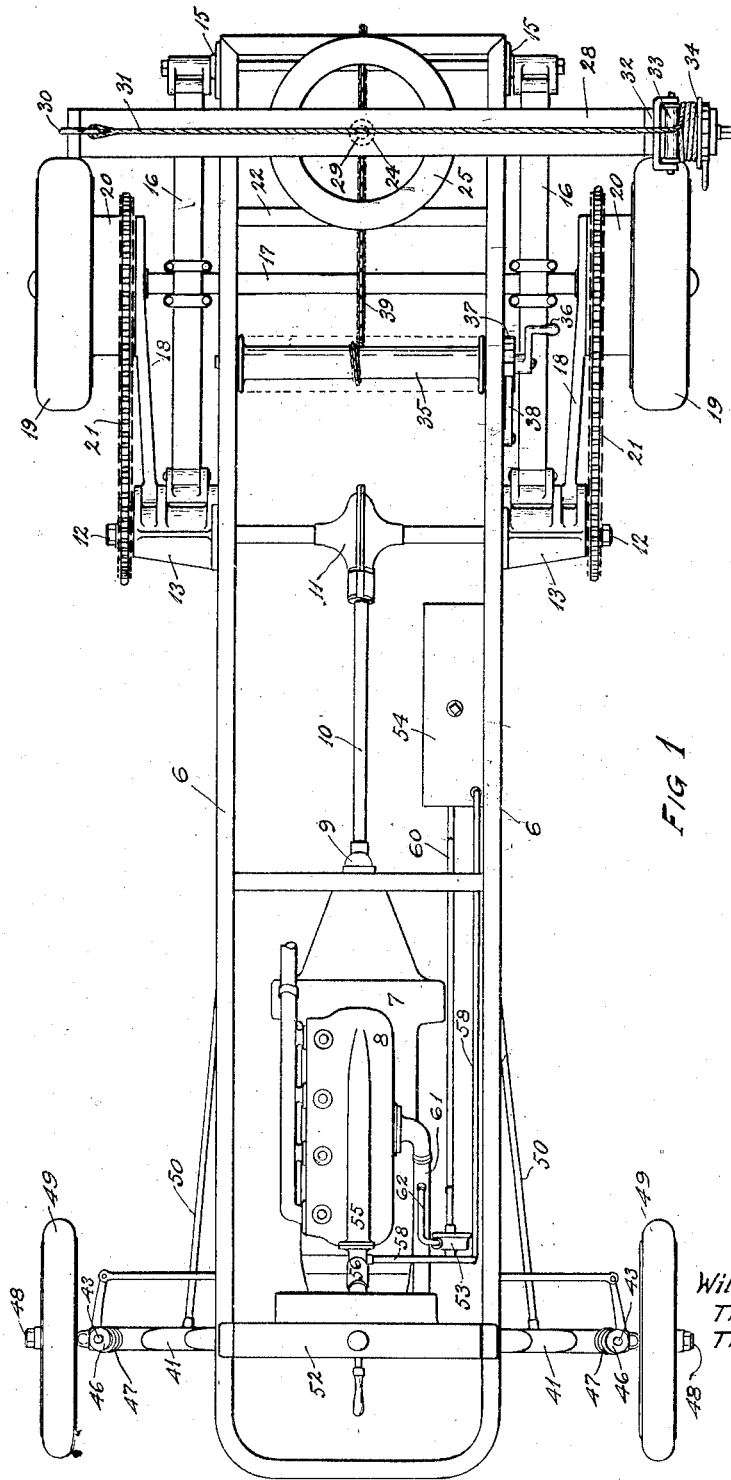
Figure 1 is a plan view of an automobile embodying our invention, with its seat and dash-board removed.

Referring to the drawings, throughout which like reference numerals indicate like parts, 6 is the chassis of an automobile upon the forward part of which is mounted, in a well known manner, an internal combustion engine 7 whose cylinders are provided with a water jacket 8, to the rearward end of whose main shaft is connected by a universal joint 9 a connecting shaft 10 that extends rearwardly and obliquely downward to operatively connect its rearward end with a differential gear within a housing 11 with which are associated transverse shafts 12 that extend in opposite directions from the housing 11 through bearings provided in brackets 13 which are fastened to the chassis 6, as shown in Fig. 1.

Figure 2:
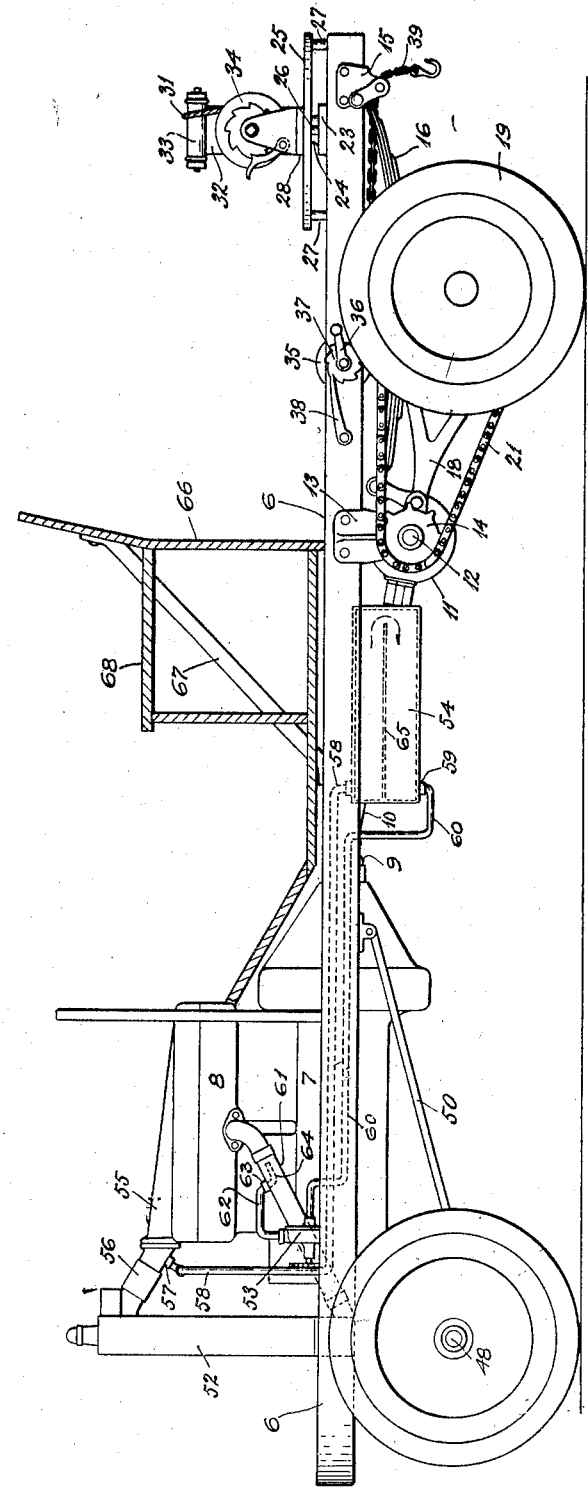
Fig. 2 is a view of the same in side elevation.

Mounted on the outwardly projecting end portions of the shafts 12, on each side of the chassis 6, are sprocket wheels, like the sprocket wheel 14 shown in Fig. 2.

Secured to each of the opposite outer sides of the rear end portion of the chassis 6 is a bracket 15 to which is articulated, in a well known manner, the rearward end of a carriage spring, as carriage springs 16, whose forward end is articulated in a like manner to the rearward side of a respective one of the brackets 13.

The central portions of the carriage springs 16 are clamped to an axle 17 transversely disposed beneath the chassis 6, which axle 17 constitutes the rear axle of the automobile to support the rearward end portion of the chassis 6.

Rigidly secured to the axle 17, adjacent to the outer edge of each of the carriage springs 16 is a brace member, as brace members 18, which extends forwardly to the adjacent one of the brackets 13 with which it is pivotally articulated, as shown more clearly in Fig. 1, which brace members 18 serve to prevent undue forward and rearward movements of the axle 17, but permit vertical movements thereof, with respect to the chassis 6.

Rotatably mounted on each of the opposite end portions of the axle 17, near one of the brace members 18, is a tractor wheel, as tractor wheels 19, from the inner side of each of which tractor wheels 19 projects a flange 20 which is provided with a concentrically disposed sprocket wheel, upon each of which sprocket wheels is mounted an endless sprocket chain, as sprocket chains 21, which extends forwardly operatively to engage with a respective one of the sprocket wheels 14 that are associated with the transverse shafts 12; thus the tractor wheels 19 may be rotated in response to revolutions of the shaft of the internal combustion engine 7 irrespective of relative vertical movements of the axle 17 and the chassis 6.

Figure 4:
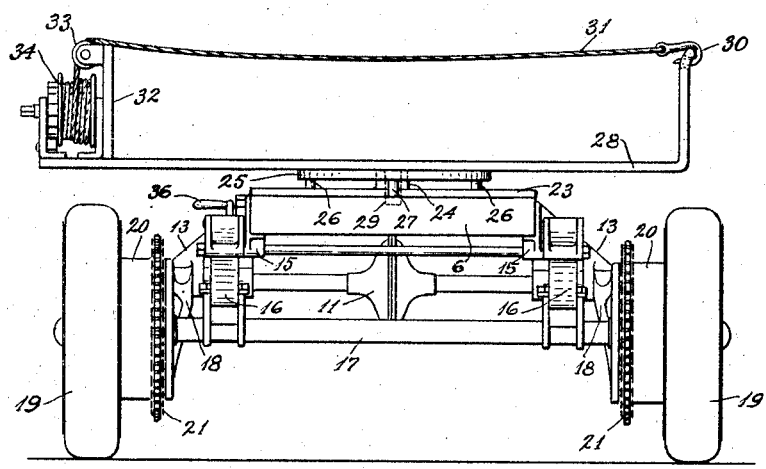
Fig. 4 is a view of the rearward portion of the same in end elevation.

Extending transversely between the opposite inner sides of the chassis 6, at a distance from the rearward end rail of said chassis 6, is a cross-brace 22, and secured at opposite points to the top surfaces of the chassis 6, in a position midway between said cross-brace 22 and the rearward end rail of the chassis 6, is a transverse beam 23, one end of which is shown in Fig. 2 and whose rearward edge is shown in Fig. 4, which transverse beam 23 is provided in its central portion with an upwardly projecting circular boss 24 through which extends downwardly a concentric hole to form a socket.

Concentrically disposed to encircle the boss 24 of the beam 23 is an annular plate 25 which is provided at opposite points on its under side with two downwardly projecting studs 26 which rest upon and are fastened to the top side of said beam 23, and is further provided at other opposite points on its under side with two other studs 27 which extend downwardly, one to be secured to and rest upon the central portion of the cross-brace 22, and the other to be secured to and rest upon the central portion of the top surface of the rearward end rail of the chassis 6, whereby the annular plate 25 is adapted to serve as a circular supporting table for a bunk 28 disposed thereon and which bunk 28 is provided with a pivot pin 29 (indicated by dotted lines in Fig. 4 and by a dotted circular line in Fig. 1) that projects downwardly from the central portion of its underside into the socket hole formed in the boss 24 of the beam 23, whereby the bunk 28 may be moved in circular directions concentric with said pivot pin 29 to any angle from a transverse line.

One end portion of the bunk 28 is bent upwardly to a right angle and provided with a hole within which may be disposed a hook, like the hook 30, which is attached to a cable 31.

The other end portion of the bunk 28 is provided with an upwardly extended bracket arm 32 on which is mounted a rotatable roller 33, and it is further provided with a pawl and ratchet-controlled windlass 34 whose shaft may be rotated by a removable crank not shown.

Operatively associated with the windlass 34 is the cable 31 which extends from the drum of said windlass 34 upwardly to and over the roller 33 thence to the hole in the opposite vertical end portion of the bunk 28 wherein its hook 30 is releasably hooked.

Rotatably disposed in bearings formed in the opposite sides of the chassis 6 is a windlass drum 35 which extends throughout the distance between said opposite sides of the chassis 6 in a line spaced from and parallel with the forward side of the cross-brace 22, said windlass drum 35 being provided with a crank 36, a ratchet wheel 37 and a pawl 38, as shown more clearly in Fig. 1, whereby said windlass drum 35 may be rotated to wind upon it a chain, as chain 39, which may be extended rearwardly to connect with a desired object, not shown, thus to move such object to draw it toward the chassis 6.

Figure 3:
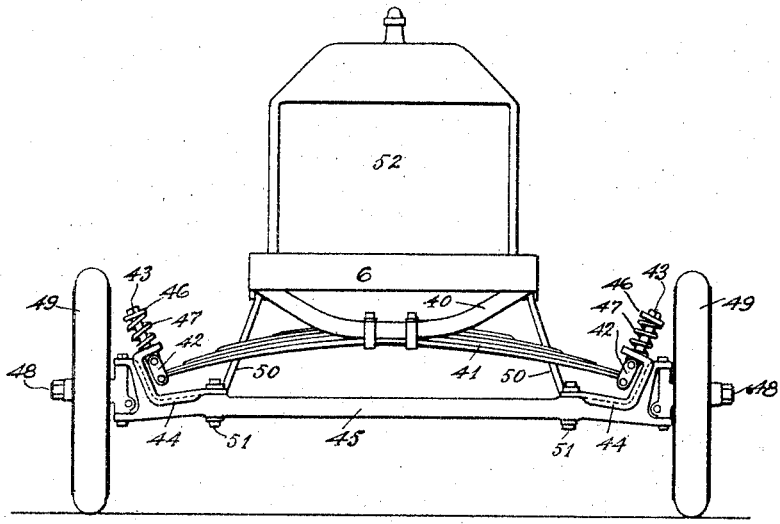
Fig. 3 is a view of the same, showing only its front axle and associated parts thereof, in front elevation.

The forward end portion of the chassis 6 is provided with a downwardly bowed cross-brace 40 whose central portion is clamped to a transverse carriage spring 41 whereby said forward end portion may be resiliently supported, as shown more clearly in Fig. 3, the opposite ends of said spring 41 being articulated to links 42 which are connected each to an eye-bolt, as eye-bolts 43, which extend obliquely upward through the angular end portion of a bracket, as brackets 44, which brackets 44 are fastened each on the top surface of a different one of the end portions of an axle 45.

On the upper end portion of each of the eye-bolts 43 is a washer 46, and disposed to surround the shank of the eye-bolt 43 is a helical compression spring 47 which extends between said washer 46 and the upper surface of the angular end portion of the bracket 44, and which serves to give an additional resilient support for the front end portion of the chassis 6.

Each of the opposite end portions of the axle 45 is provided with a common form of swiveled wheel-spindle 48 with a wheel 49 mounted thereon in a well known manner to adapt said wheels to be turned to direct the vehicle in a desired course.

Two brace-rods 50 are disposed with their rearward ends pivotally articulated to the underside of the chassis 6 at opposite points thereof while their forward ends are rigidly fastened to the axle 45 by bolts 51 as indicated in Fig. 3, whereby the chassis 6 may move in vertical directions with respect to the axle 45 but may not move forward or backward with respect to said axle 45.

In order that the cylinders of the combustion engine 7 may not be heated to a temperature that will injure them we have provided novel means for causing cold water to circulate through its water jacket 8, which novel means is more clearly shown in Figs. 1 and 2, and which includes a common form of radiator 52, a rotary pump 53 of well known form of construction and a tank 54.

Leading out of the top wall of the water jacket 8 is an outlet conduit 55 to which is connected a conduit 56 that extends to and connects with the upper portion of the radiator 52 whereby water may flow from the interior of the water jacket 8 into the interior of the upper portion of said radiator 52.

Fixed in the underside of the wall of the conduit 56 is a nipple 57 which extends therethrough, to which nipple is connected a pipe 58 that extends in an irregular course rearwardly to connect with the interior of the tank 54 through its top wall, said tank 54 being fastened to the inner side of one side rail of the chassis 6 near its central portion.

Extending through the bottom wall of the tank 54 is a nipple 59 to which is connected a pipe 60 that extends forward in an irregular course to the intake passageway of the pump 53 with which it is connected.

Connected with the lower portion of the interior of the water jacket 8 is a conduit pipe 61 which extends downwardly and forwardly to connect with the bottom portion of the interior of the radiator 52.

The outlet passageway of the pump 53 is connected by a pipe 62 with a nipple 63 that extends through the upper side of the wall of the conduit 61 and within the conduit 61 there is a nozzle 64, indicated by dotted lines in Fig. 2, which nozzle 64 is connected to the inner end of the nipple 63 in such position that it may serve to direct a jet of water toward the water jacket 8 in response to the operation of the rotary pump 53.

The operation of cooling apparatus thus described is as follows: The tank 54, the radiator 52 and the water jacket 8 are filled with cold water, in an obvious manner, and upon the operation of the engine 7 the pump 53 will be actuated to pump water from the bottom portion of the tank 54 to cause such water to flow through the pipe 60, through the pump 53, thence through the pipe 62 into and through the nozzle 64 from which it issues with considerable force in the form of a jet to act like a vacuum jet and thus cause water to flow from the bottom of the radiator through the conduit 61 into the lower portion of the water jacket 8 which water will then flow out of the outlet conduit 55 into the conduit 56 from which a portion of such water will flow into the top portion of the radiator 52 while another portion of it will be diverted to flow through the nipple 57, thence through the pipe 58 into the upper portion of the tank 54, within which tank 54 is a deflecting plate 65, indicated by dotted lines in Fig. 2, which deflecting plate 65 causes all the water that enters the top of the tank 54 at one end to flow rearwardly throughout the length of the tank 54 to the other end thereof, thence to flow forwardly to the nipple 59 and into the pipe 60.

Thus the tank 54 not only serves as a reservoir for a larger supply of water but it also acts as an auxiliary radiator in the operation of keeping all of the water cool, thus constantly to supply the water jacket 8 with cool water during the operation of the engine 7.

An automobile embodying our invention, as illustrated in the drawings and hereinbefore described, is particularly adapted to serve efficiently and economically as a tractor for drawing slowly in its trail one or more other vehicles heavily loaded, although its front wheels be small and cheaply constructed and its engine be light in weight and of comparatively little power, since its tractor wheels are strong, heavy and of great width across their peripheries, and the small power of its engine operating at a high speed is communicated to said tractor wheels by such system of sprocket wheels and chains that said tractor wheels are driven slowly with a powerful tractive effect.

If it be desired to draw a two wheeled lumber truck loaded with lumber disposed in the usual manner on its single axle, the operation may be described as follows:

The automobile is disposed with its rearward end in the roadway in front of the loaded truck then the pawl 38 is disengaged from the ratchet wheel 37 and the chain 39 unwound from the windlass drum 35 sufficiently to permit it to extend to the loaded truck to which it is then connected by the hook on its free end, the hook 30 and cable 31 being disconnected from the upwardly extended end portion of the bunk 28.

The pawl 38 is then placed in engagement with the ratchet wheel 37 whereupon the crank 36 is actuated to wind the chain on to the windless drum 35 to draw the loaded truck toward the automobile until the forward end portion of the load of lumber or timbers reaches a point where it may be guided to rest upon and be supported by the bunk 28, whereupon the cable 31 is unwound from the windlass 34 sufficiently to permit said cable 31 to be extended over the top of said end portion of the load to dispose the hook 30 in its hole in the upwardly extended end portion of the bunk 28 thus to confine said end portion of said load in its position on the bunk 28 in response to the operation of the windlass 34 whereby in an obvious manner, said cable 31 is drawn with great force to bind said end portion of said load on to said bunk 28.

In order to prevent an undue forward movement of the lumber or timbers, disposed with their forward end portions bound on to the bunk 28, when the automobile with its trailing loaded-truck is going down a steep hill, we have provided a heavy metal plate 66 which is disposed to extend upwardly from and transversely of the chassis 6, and which is rigidly braced in its upright position by a brace, like the brace 67, one of which braces 67 is disposed on each side of the chassis 6 to extend from the upper portion of the plate 66 obliquely downward and forward to the side rail of the chassis 6, as indicated in Fig. 2, the upper portion of said plate 66 incidently serving as a brace for a driver's seat 68. Thus, if the lumber or timbers being transported down a hill be not sufficiently bound to the bunk 28 to prevent their forward movement, then such forward movement will be limited by contact of the end surfaces of the lumber or timbers with the rearward side surface of the plate 66.

Manifestly, with the loaded lumber yard truck thus disposed as a trailer, the automobile may be operated to change its course to any direction during its travel since the bunk 28 is pivoted to adapt it to move on the annular plate 25 to any angle with respect to the course traveled by the automobile.

Obviously, changes may be made in the form, dimensions and arrangement of parts of our invention without departing from the spirit thereof.

What we claim is:

1. In combination with the chassis of a motor vehicle including side rails and a rear end rail, a cross brace secured to said side rails forwardly of said rear end rail, a transverse beam secured to said chassis between the end rail and the cross brace, an annular plate having studs secured to said end rail, cross brace, and transverse beam, and a lumber bunk pivoted intermediate its ends to said transverse beam and resting on said annular plate.

2. In combination with the chassis of a motor vehicle, a lumber bunk mounted on the rear end portion thereof, said bunk comprising a strip having one end portion thereof bent upwardly and provided with an aperture, an upwardly extending bracket arm carried by the other end of said strip, a guide roller journaled on said bracket arm, a windlass drum revolubly mounted on said other end of said strip, and a cable associated with said drum guided by said roller and having a hook on its free end engageable in said aperture.

In witness whereof, we hereunto subscribe our names this 2nd day of December, A. D., 1916.

WILLIAM H. B. JOHNSON.
THEODORE E. LIND.
THOMAS W. CLARKE.

Witnesses:
FRANK WAREN,
O. JOHNSON.

Copies of this patent may be obtained for five cents each, by addressing the "Commissioner of Patents, Washington, D. C."